UNITED STATES PATENT OFFICE.

HUGO GELDERMANN, OF GROSS-LICHTERFELDE-OST, NEAR BERLIN, GERMANY, ASSIGNOR TO ACTIEN GESELLSCHAFT FÜR ANILIN FABRIKATION, OF BERLIN, GERMANY.

AZO DYE FOR WOOL.

1,011,770. Specification of Letters Patent. Patented Dec. 12, 1911.

No Drawing. Application filed April 1, 1911. Serial No. 618,359.

*To all whom it may concern:*

Be it known that I, HUGO GELDERMANN, a subject of the Emperor of Germany, residing at Gross-Lichterfelde-Ost, near Berlin, Germany, and my post-office address being Grabenstrasse 12, Gross-Lichterfelde-Ost, near Berlin, Germany, have invented certain new and useful Improvements in Azo Dye for Wool, of which the following is a specification.

My invention relates to the manufacture of new azo dyes which are especially adapted for dyeing wool in combination with chrome mordants and may be obtained by combining diazotized 2-aminophenol derivatives containing negative substituents with 2-naphthol-4-sulfonic acid. The dyes thus manufactured produce on wool in combination with a suitable chrome-mordant black tints of a good fastness.

The following examples serves to illustrate my invention, the parts being by weight: 18.9 parts of 6-nitro-4-chloro-2-aminophenol are diazotized in known manner by means of 30 parts of hydrochloric acid of 20° Bé. specific gravity and 7 parts of sodium nitrite and the diazo compound thus obtained is allowed to run while stirring into an aqueous solution of 23 parts of 2-naphthol-4-sulfonic acid and 30 parts of calcined sodium carbonate. The combination being finished the dye is precipitated by the addition of common salt, drained and dried. It is thus obtained when pulverized in the shape of a dark powder, which may be dyed on wool from a dye-bath containing sodium chromate in connection with ammonium sulfate, thus producing bluish black shades.

The new dye as above obtained dissolves in water to a violet solution, which on the addition of an alkali assumes a more reddish color, whereas by the addition of sulfuric acid the red colored free acid of the dye is formed; in concentrated sulfuric acid it dissolves to a violet solution; when heated with stannous chlorid and hydrochloric acid the dye is decomposed yielding 2.6-diamino-4-chlorophenol besides 1-amino-2 naphthol-4-sulfonic acid.

It is obvious to those skilled in the art that my present invention is not limited to the foregoing example or to the details given therein. It may be stated, for instance, that instead of the 6-nitro-4-chloro-2-aminophenol other 2-aminophenol derivatives containing negative substituents, such as 4-nitro-2-aminophenol, 6-nitro-2-amino-4-methylphenol, 4-chloro-2-aminophenol, 5-nitro-4-chloro-2-aminophenol, 4.6-dinitro-2-aminophenol, 4-chloro-6-sulfo-2-aminophenol, 4-acetylamino-6-sulfo-2-aminophenol and the like may be used.

Having now described the invention and the manner in which it may be performed what I claim is,—

1. As new articles of manufacture the hereinbefore-described new azo dyes derived from diazotized 2-aminophenol compounds containing negative substituents and 2-naphthol-4-sulfonic acid, these new dyes producing on wool from a dye-bath containing a neutral alkali chromate in connection with an ammonium salt, generally speaking, black shades, which new dyes in the shape of their sodium salts when pulverized are dark powders soluble in water to blue to violet solutions, which on the addition of an alkali assume a more reddish color, whereas by the addition of sulfuric acid the red colored free acids of the dyes are formed, which dyes dissolve in concentrated sulfuric acid to violet solutions, and which dyes are decomposed when heated with stannous chlorid and hydrochloric acid yielding 2-aminophenol compounds besides 1-amino-2-naphthol-4-sulfonic acid.

2. As a new article of manufacture the hereinbefore-described new azo dye derived from diazotized 6-nitro-4-chloro-2-aminophenol and 2-naphthol-4-sulfonic acid, this new dye producing on wool from a dye-bath containing a neutral alkali chromate in connection with an ammonium salt, generally speaking, black shades, which new dye in the shape of its sodium salt when pulverized is a dark powder, soluble in water to a violet solution, which on the addition of an alkali assumes a more reddish color, whereas by the addition of sulfuric acid the red colored free acid of the dye is formed, which dye dissolves in concentrated sulfuric acid to a violet solution, and which dye is decomposed when heated with stannous chlorid and hydrochloric acid yielding 2.6-diamino-4-chlorophenol besides 1-amino-2-naphthol-4-sulfonic acid.

In testimony whereof I have hereunto set my hand in presence of two subscribing witnesses.

HUGO GELDERMANN.

Witnesses:
 HENRY HASPER,
 WOLDEMAR HAUPT.